United States Patent [19]

Engdahl et al.

[11] 4,291,550
[45] Sep. 29, 1981

[54] FLUIDIZED BED CRYSTALLIZATION APPARATUS AND METHOD

[75] Inventors: Gerald E. Engdahl, Wheaton; James B. Maher, Oak Brook, both of Ill.

[73] Assignee: Chicago Bridge & Iron Company, Oak Brook, Ill.

[21] Appl. No.: 121,495

[22] Filed: Feb. 14, 1980

[51] Int. Cl.³ ............................................. B01D 9/04
[52] U.S. Cl. ...................................... 62/544; 62/532; 62/123; 134/8; 422/245
[58] Field of Search ................. 62/532, 533, 534–536, 62/541–544, 123–124; 23/273 R, 273 F; 134/8

[56] References Cited
U.S. PATENT DOCUMENTS

| | | | |
|---|---|---|---|
| 2,119,182 | 5/1938 | Schuftan et al. | 62/544 |
| 3,375,082 | 3/1968 | Graf | 62/542 |
| 3,628,344 | 12/1971 | King | 62/541 |
| 4,162,617 | 7/1979 | Schmidt et al. | 62/543 |

Primary Examiner—Norman Yudkoff
Attorney, Agent, or Firm—Merriam, Marshall & Bicknell

[57] ABSTRACT

A method of crystallizing or freezing out a component of a mixture composed of a liquid and a dissolved or suspended solid material, or both, by passing the mixture upwardly through a column containing a mass of insoluble solid particles having a specific gravity greater than that of the mixture; by heat exchange to a cold fluid, indirectly cooling the mixture to a temperature at which the component crystallizes or freezes out of solution, as it flows upwardly in the column; said component being the liquid or dissolved solid material; and said flow of the mixture through the column being at a sufficient velocity to fluidize the insoluble solid particles into turbulent action to scour the column inside surface and thereby prevent build up thereon of the crystallized or frozen out component.

Apparatus for practicing the method is also disclosed.

3 Claims, 1 Drawing Figure

U.S. Patent  Sep. 29, 1981  4,291,550
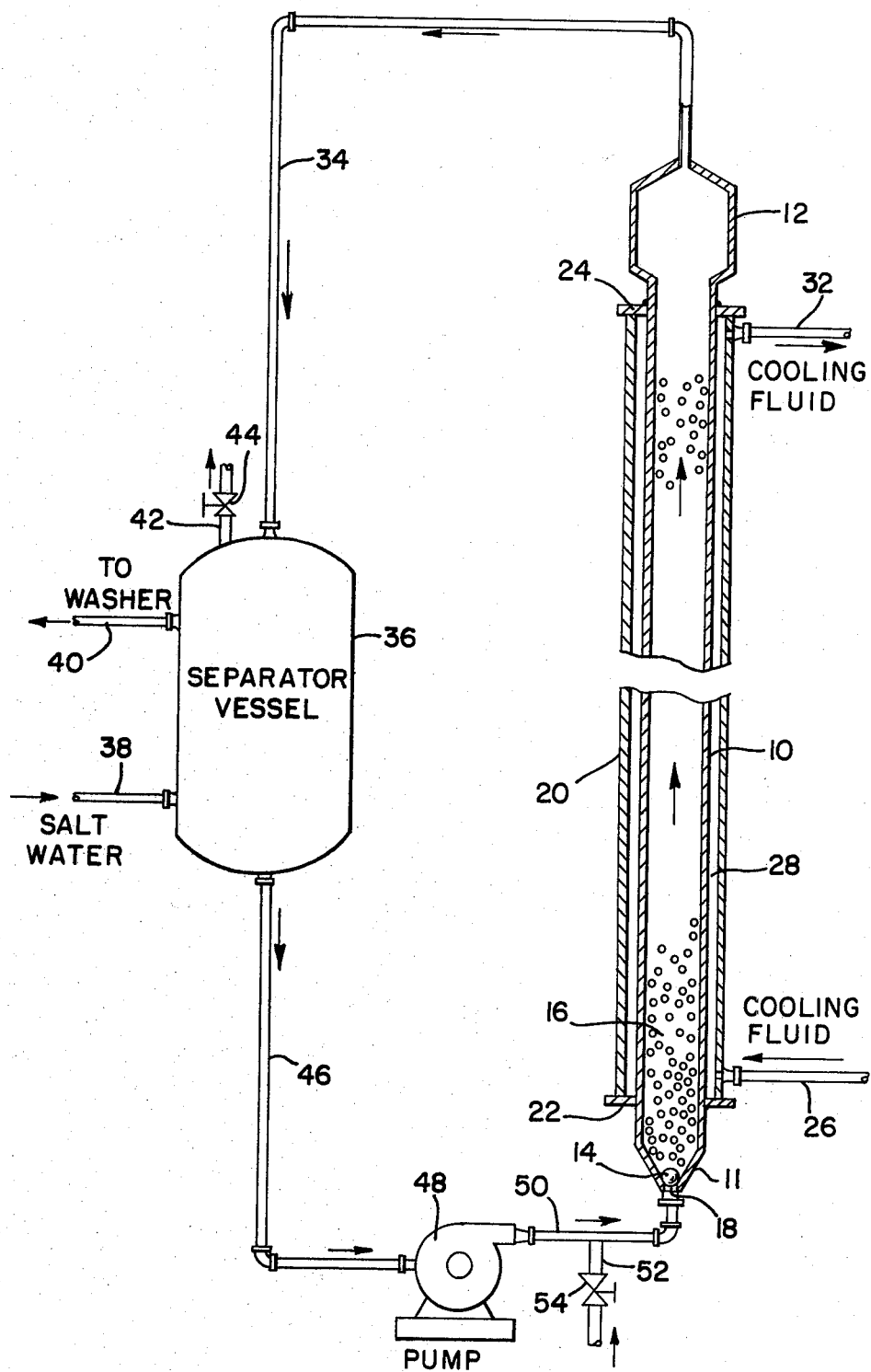

FLUIDIZED BED CRYSTALLIZATION APPARATUS AND METHOD

This invention relates to apparatus and methods for crystallizing, or freezing out, a component of a liquid mixture. More particularly, this invention is concerned with the use of a fluidized bed to scour a column cooling surface, and thereby prevent the frozen component from adhering to and building up on the column surface.

BACKGROUND OF THE INVENTION

Many industrial processes involve the crystallization or freezing out of a component from a liquid mixture, which is either a solution or a suspension. The component removed from the liquid mixture may be either the liquid phase or solvent, or it may be a dissolved solid which crystallizes or freezes out. When a dissolved solid is crystallized or frozen out by cooling a liquid mixture, this occurs through a reduction in the solubility of the solid in the liquid and removal of heat of fusion. When the liquid is crystallized or frozen out, the cooling must be sufficient to remove enough heat to convert at least part of the liquid to the solidified component.

A specific process in which a component of a liquid mixture is crystallized or frozen out is in the production of fresh water from salt water which, as used herein, includes sea water, brine, and brackish water. In this process, salt water is cooled to a low enough temperature to form ice crystals which are then separated from the salt water, washed, and melted to give fresh water. When the ice crystals form, dissolved salt is excluded from the ice, so that, upon melting, essentially salt free fresh water is obtained. Some U.S. patents which disclose such a process are: U.S. Pat. Nos. 3,012,409; 3,251,192; 3,605,426; 3,367,123; and 4,164,854.

A process similar to that described to produce fresh water is used to concentrate fruit and vegetable juices, particularly orange and grapefruit juices. The juice temperature is lowered until ice crystals form. Continual removal of the ice lowers the water content and concentrates the juice.

One inherent problem with the crystallization or freezing out of a component from a liquid mixture is the following. The component so removed often has a strong affinity to deposit on, or stick to, the surface of a heat exchanger by which the liquid mixture is cooled to separate out the component. Component build up on the heat exchanger surface reduces heat transfer and thereby lowers cooling efficiency. Furthermore, continuation of the build up can result in reduced flow and, finally, plugging of the heat exchanger and/or ancillary equipment and conduits. There is, accordingly, a need for an improved process and apparatus for crystallizing or freezing out a component from a liquid mixture. The improvement should eliminate or at least reduce component build up or deposition on the heat exchange surfaces by which the liquid mixture is cooled.

SUMMARY OF THE INVENTION

One aspect of the invention provides a method of crystallizing or freezing out a component of a mixture composed of a liquid and dissolved or suspended solid material or both by passing the liquid mixture upwardly through a column containing a mass of insoluble solid particles having a specific gravity greater than that of the liquid mixture; by heat exchange to a cold fluid indirectly cooling the mixture to a temperature at which the component crystallizes or freezes-out of solution, as it flows upwardly in the column; said component being the liquid or dissolved solid material; and said flow of the mixture through the column being at a sufficient velocity to fluidize the insoluble solid particles into turbulent action to scour the column inside surface and thereby prevent build up thereon of the crystallized or frozen out component.

The described method can be used to remove the liquid or the dissolved solid material as the component. The method is particularly useful when the crystallized or frozen out component has a specific gravity less than that of the mixture and less than that of the insoluble solid particles. Then, the component will float and can be removed by decantation procedures.

While the method can be used to separate a wide variety of materials from a liquid mixture, it is especially useful in producing fresh water from salt water, and in concentrating fruit and vegetable juices. When the method is used for such purposes, the separated component is the liquid, i.e., water in the form of ice.

The insoluble solid particles can be made of any suitable material which will not react to any appreciable extent with the liquid mixture. The particles can be made of metal such as stainless steel, copper, or nickel; of glass; or of a ceramic material such as china. Such materials provide rigid shape-retaining solid particles. The particles can be ball-shaped or spheres, or they can be of some other solid geometric shape such as ellipsoidal. The particle size is not critical but should be selected to maintain the particles in the column without spilling out, when fluidized at the scrubbing or scouring flow rate.

A further aspect of the invention provides novel apparatus comprising: a column having a liquid inlet at the bottom and a liquid outlet at the top; a mass of insoluble, solid, fluidizable particles occupying part of the column internal space when at rest; said column having means to indirectly cool a liquid product when it flows through the column from the inlet to the outlet to freeze out a component of the liquid product; a conduit from the column outlet to a separator vessel for removing the crystallized or frozen component from the liquid product; a conduit from the separator vessel to a pump; a conduit from the pump to the column inlet; a liquid product supply conduit communicating with the separator vessel; and, a withdrawal conduit for removing the crystallized frozen component from the separator vessel.

The apparatus desirably includes a valve means so that the solid, fluidizable particles when at rest are maintained in the column. The valve means can be located in the column.

The apparatus can also have a gas inlet means for supplying a gas to the column lower interior portion to aid in fluidizing the solid particles. A gas outlet means can be included for removing gas from the column upper interior portion.

BRIEF DESCRIPTION OF THE DRAWING

The attached drawing shows a column containing a fluidizable bed of insoluble solid particles, means to indirectly cool a liquid mixture flowing upwardly in the column, and ancillary equipment for separating a component crystallized or frozen out of the liquid mixture.

DETAILED DESCRIPTION OF THE DRAWING

With reference to the drawing, the column 10 is a vertically positioned metal tube having an inwardly sloping conical bottom or lower end 11 and an enlarged or wider top or upper end 12. Ball 14 is located in conical lower end 11 to prevent the bed 16 of metal balls, having a diameter of 0.1 inch, from flowing out of the opening 18 in the column lower end 11 when the upward fluid flow in the column is inadequate to fluidize bed 16. Thus, the ball 14 constitutes a valve.

Surrounding column 10 is a larger diameter jacket tube 20 which is closed and joined at each end to column 10 by plates 22 and 24. Conduit 26 communicates with the lower portion of space 28 between column 10 and jacket tube 20. Conduit 26 is used to supply a cold fluid, such as a water/ethylene glycol mixture, to space 28. Conduit 32 communicates with the upper portion of space 28 and is used to withdraw the cooling fluid.

Conduit 34 extends from the column conical upper end 12 to the top of separator vessel 36 that contains the liquid mixture from which a component is being crystallized or frozen out. Conduit 38 communicates with the lower portion of separator vessel 36 and is used to feed the liquid mixture, such as salt water, into the apparatus. Conduit 40 communicates with the upper portion of separator vessel 36 and is used to withdraw the crystallized or frozen out component floating on the liquid in the vessel.

Conduit 42, containing valve 44, communicates with the very top internal portion of separator vessel 36 and is used to vent off gas fed into the column 10 to aid in fluidizing bed 16.

Conduit 46 extends from the bottom of separator vessel 36 to pump 48 and is used to feed the liquid mixture from the vessel to the pump. Conduit 50 delivers the pressurized liquid mixture from pump 48 to the column opening 18 for upward flow in the column. Conduit 52, having valve 54, can be used to feed a gas, such as air or nitrogen, into the liquid mixture to aid in fluidizing bed 16. It should be understood that use of a gas is optional in many cases. If a gas is used, it can be cooled before introduction into the system by conduit 52.

The apparatus illustrated by the drawing and described above is particularly useful in producing fresh water from salt water. As the salt water flows upwardly in column 10, it is chilled by indirect heat exchange with the cooling fluid circulated through space 28. Ice crystals composed of fresh water form in the column. The upward flow of the salt water fluidizes bed 16 throughout the height of the column. The bed turbulence scours the internal surface of column 10, thereby preventing deposition, and build up, of ice on that surface. The column enlarged top end 12 lowers the velocity of the upward flow and thus aids in preventing the metal balls 16 from leaving the column. A mixture of ice particles and salt water is conveyed from the column 10 by conduit 34 to separator vessel 36. The floating ice is withdrawn with some salt water by conduit 40 and fed to a washer, not shown, where the ice is washed essentially free of salt water by fresh water. The ice is then melted to produce fresh water.

Salt water is fed into the apparatus by conduit 38 as needed. It is precooled in vessel 36 by intermixing with the cold salt water fed to the vessel by conduit 34.

Flow of salt water through column 10 can be regulated by pump 48 to very precisely control the fluidization of bed 16 and the amount of ice formed in the column.

It is within the scope of the invention to incorporate a plurality of columns 10 in a single jacket tube 20 so that, for example, two, three or more columns can be cooled simultaneously using a single cooling fluid. The columns could be arranged in such a jacket tube 20 like a shell and tube heat exchanger is arranged.

The foregoing detailed description has been given for clearness of understanding only, and no unnecessary limitations should be understood therefrom, as modifications will be obvious to those skilled in the art.

What is claimed is:

1. A method of crystallizing or freezing out a component of a mixture composed of a liquid and a dissolved or suspended solid material, or both, which comprises:

passing the mixture upwardly through a column containing a mass of insoluble metal balls having a specific gravity greater than that of the mixture;

by heat exchange to a cold fluid, indirectly cooling the mixture to a temperature at which the component crystallizes or freezes out of solution, as it flows upwardly in the column;

said component being the liquid or dissolved solid material; and said flow of the mixture through the column being at a sufficient velocity to fluidize the insoluble metal balls into turbulent action to scour the column inside surface and thereby prevent build up thereon of the crystallized or frozen out component.

2. A method of freezing out a component of a solution composed of a solvent and a solute which comprises:

passing the solution upwardly through a column containing a mass of insoluble metal balls having a specific gravity greater than that of the solution;

by heat exchange to a cold fluid, indirectly cooling the solution to a temperature at which the component crystallizes or freezes out of solution, as it flows upwardly in the column; and said flow of the solution through the column being at a sufficient velocity to fluidize the insoluble metal balls into turbulent action to scour the column inside surface and thereby prevent build up thereon of the crystallized or frozen component.

3. Apparatus comprising:

a column having a liquid inlet at the bottom and a liquid outlet at the top;

a mass of insoluble, solid, rigid, shape-retaining, fluidizable metal balls occupying part of the column internal space when at rest;

said column having means to indirectly cool a liquid product, flowing through the column from the inlet to the outlet, to crystallize or freeze out a component of the liquid product;

a conduit from the column outlet to a separator vessel for removing the crystallized or frozen out component from the liquid product;

a conduit from the separator vessel to a pump;

a conduit from the pump to the column inlet;

a liquid product supply conduit communicating with the separator vessel; and a withdrawal conduit for removing the crystallized or frozen out component from the separator vessel.

* * * * *